A. P. DURANT.
Grain-Drill.

No. { 1,821, / 32,825. }

Patented July 16, 1861.

Witnesses:

Inventor:

UNITED STATES PATENT OFFICE.

A. P. DURANT, OF ATLANTA, ILLINOIS.

IMPROVEMENT IN SEEDING-CULTIVATORS.

Specification forming part of Letters Patent No. 32,825, dated July 16, 1861.

*To all whom it may concern:*

Be it known that I, A. P. DURANT, of Atlanta, in the county of Logan and State of Illinois, have invented certain new and useful Improvements in Seeding Machines and Cultivators; and I do hereby declare that the following is a full, clear, and exact description of the same, reference being had to the annexed drawings, making a part of this specification, and to the letters of reference marked thereon.

The object of this invention is to combine a seeding-machine and a corn-planter with a cultivator to form one machine that may be used for the several purposes to which these machines are applicable; and it consists of a suitably-arranged frame mounted on wheels, and carrying a self-acting sower in front that may be regulated by the driver, and a corn-planter behind that may be hung up to the frame, out of the way, when it is not desired to use it; and it further consists of arranging the plows in such a way that they may be readily lifted from the ground, and may be shifted by the driver to the right and left in conformity with crooked rows of corn that may be under cultivation.

To enable others skilled in the art to make and use my machine, I will proceed to describe its construction and operation.

Figure 1:
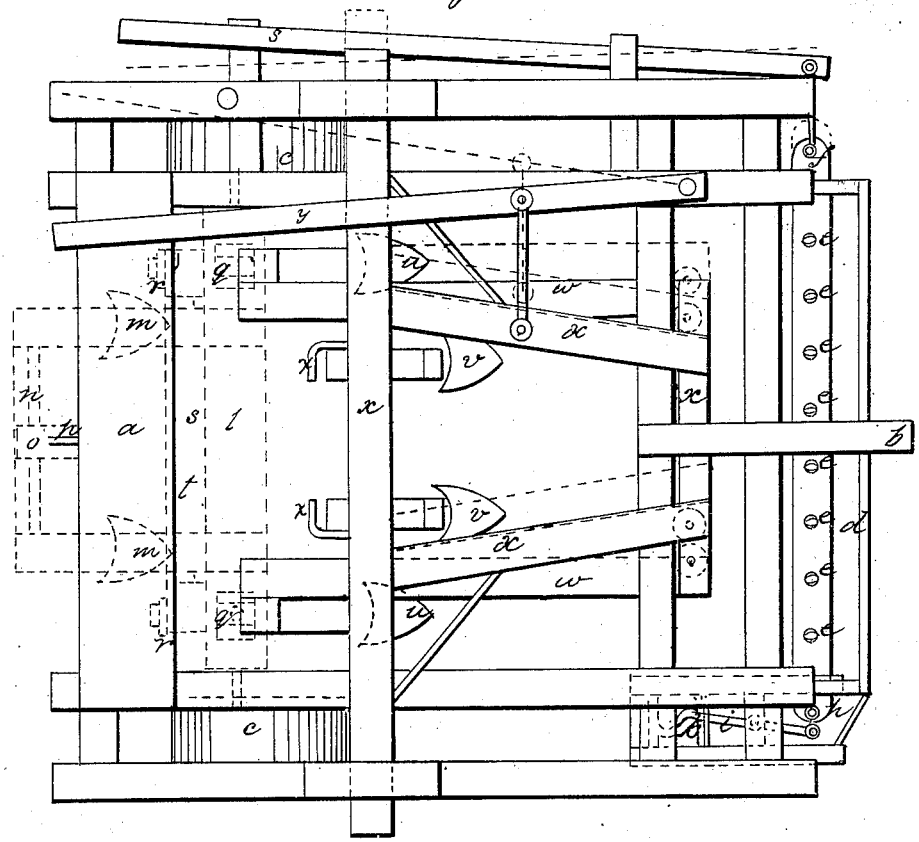
Figure 2:
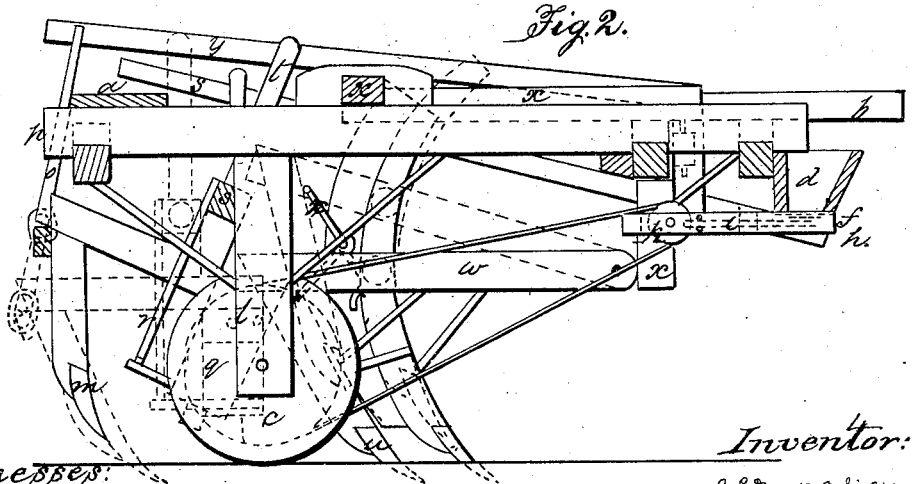

Figure 1 of the drawings is a plan view of my said improved machine, and Fig. 2 is a side elevation of the same. The lines in red indicate the variations in position of which the different parts are susceptible.

The seat $a$ on the rear of the machine is for the driver.

$b$ is the tongue, to which the horses are attached, and $c\ c$ are the wheels.

The seed-hopper $d$ extends across the front, and has a bottom provided with holes $e$ for the passage of the seed.

Under the bottom of the seed-hopper is a slide-plate, $f$, that is also furnished with corresponding holes, which may be partially or completely closed by shifting the slide-plate $f$ by means of the lever $g$, that leads along the side of the machine from near the driver's seat. There is a second slide-plate, $h$, also with similar holes, that is worked by the lever $i$, vibrating in a frame that carries the cam $k$, which derives its rotary motion by a belt from a pulley attached to one of the wheels. The rotation of the cam $k$ shifts the slide-plate $h$ back and forth and alternately opens and closes the seed-openings of the hopper. The cam-lever $i$ is retained in a horizontal position by the guides near the cam.

The corn-planter at the rear of the machine is shown in red lines with the plows in the ground. It consists of a transverse beam, $l$, which is carried by journals on the rear side of the inner standards of the wheels, two longitudinal plow-beams carrying the plows $m\ m$ and secured to the beam $l$, and another transverse beam, $n$, extending between the plow-beams, to which is linked a bar, $o$, that hooks over the stud-hook $p$. The beam $l$ also carries two hoppers, $q\ q$, with suitable slides that are worked by the levers $r\ r$ on the shaft $s$, the handle $t$ of which passes up in front of the driver.

The corn-planter may be hooked up, as is drawn in black lines, or it may be dropped to permit the plows to enter the ground, with the handle to the slides convenient to the right hand of the driver, who deposits the corn by shifting the handle.

The cultivator-plows $u\ u$ and $v\ v$ and the plow-beams $w\ w$, to which they are attached, are all connected with the frame composed of the parts marked $x$, that may be shifted right and left by the lever $y$, as indicated in red lines in Fig. 1, for the purpose of conforming with any irregularity of the hills, or for any other purpose. The front beam of the frame $x$ carries two friction-rollers that bear on a transverse beam of the frame.

The plow-beams $w$ may be elevated to lift the plows when necessary, as is shown by red lines in Fig. 2, by means of the treadle-levers Z.

The frame of the machine may be braced in any suitable manner; but I prefer the plan of construction illustrated on the drawings.

When it is desired to operate the sower only the cultivator-plows and the corn-planter are hooked up, or the latter may be detached entirely. The regulating-slide $f$ is set to allow the proper quantity of seed to pass from the hopper, and when the machine is drawn over the ground the rotation of the wheels causes the cam $k$ to revolve and the seed-slide $h$ to alternately open and close the openings $e$ in the bottom of the hopper. By means of the lever $g$ the openings may be at any time closed by the driver without requiring him to leave his seat.

When the machine is used for planting corn the seed-hopper is closed by the lever $g$, or the sowing apparatus may be disconnected by removing the belt. The corn-planter is let down to the position shown in red lines, in which the plows $m\ m$ enter the ground, and the driver deposits the seed as may be required by moving the slides of the hoppers $q\ q$ with the lever $t$.

In cultivating corn the planter is hooked up or detached and the plows $u\ u$ and $v\ v$ are allowed to enter the ground, when they may be shifted transversely, as is indicated in red lines in Fig. 1, by the lever $y$, and they may be lifted again, when necessary, by the levers $z\ z$.

I claim as my invention and desire to secure by Letters Patent—

1. The combination of a seeding-machine, a corn-planter, and a cultivator in a single machine, arranged and operated in the manner described, and for the purposes specified.

2. In combination therewith, the attachment of the cultivator-plows to a separate frame that may be shifted transversely by a lever when desired, substantially in the manner described.

A. P. DURANT.

Witnesses:
H. O. TATMAN,
MILTON HICKS.